United States Patent
Sato

(10) Patent No.: US 7,158,344 B2
(45) Date of Patent: Jan. 2, 2007

(54) THIN-FILM MAGNETIC HEAD HAVING HELICAL COILS AND MANUFACTURING METHOD FOR THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 423 days.

(21) Appl. No.: 10/795,642

(22) Filed: Mar. 8, 2004

(65) Prior Publication Data

US 2004/0179295 A1    Sep. 16, 2004

(30) Foreign Application Priority Data

Mar. 12, 2003   (JP)   ............................. 2003-066198

(51) Int. Cl.
  *G11B 5/17*   (2006.01)
  *G11B 5/23*   (2006.01)
(52) U.S. Cl. ...................... 360/123; 360/126
(58) Field of Classification Search ............. 360/123, 360/126
  See application file for complete search history.

(56) References Cited

U.S. PATENT DOCUMENTS

| | | | |
|---|---|---|---|
| 6,163,435 A | 12/2000 | Gaud et al. | |
| 6,275,354 B1 | 8/2001 | Huai et al. | |
| 6,965,495 B1 * | 11/2005 | Sato et al. | 360/126 |
| 6,971,156 B1 * | 12/2005 | Matono | 29/603.15 |
| 6,987,644 B1 * | 1/2006 | Sato et al. | 360/123 |
| 2004/0100727 A1 * | 5/2004 | Sato et al. | 360/123 |
| 2004/0100731 A1 * | 5/2004 | Sato | 360/126 |
| 2004/0179295 A1 * | 9/2004 | Sato | 360/123 |
| 2004/0246622 A1 * | 12/2004 | Sato | 360/126 |
| 2004/0246629 A1 * | 12/2004 | Sato | 360/317 |
| 2005/0105212 A1 * | 5/2005 | Sato | 360/123 |
| 2005/0243466 A1 * | 11/2005 | Kameda et al. | 360/126 |

FOREIGN PATENT DOCUMENTS

| | | |
|---|---|---|
| JP | 06-103531 | 4/1994 |
| JP | 07-141621 | 6/1995 |
| JP | 2000-137902 | 5/2000 |
| JP | 2002-008207 | 1/2002 |

OTHER PUBLICATIONS

Copy of the Notification of Reasons for Refusal dated Apr. 25, 2006 for corresponding Japanese Patent Application No. 2003-066198.

* cited by examiner

*Primary Examiner*—Jefferson Evans
(74) *Attorney, Agent, or Firm*—Brinks Hofer Gilson & Lione

(57) ABSTRACT

A plurality of first coil segments is formed in a space encompassed by a lower core layer, a protuberant layer, and a back gap layer, and a magnetic pole layer is deposited on the first coil segments. Ends of adjacent first coil segments are connected through the intermediary of a plurality of second coil segments formed on the magnetic pole layer so as to form a helical coil layer. The upper surfaces of the protuberant layer, the first coil segments, and the back gap layer are formed to be a continuous planarized surface. A Gd-determining layer made of an insulating material is formed on the planarized surface such that it covers the upper surfaces of the first coil segments. The Gd-determining layer serves also as an insulating layer that isolates the first coil segments and the magnetic pole layer.

20 Claims, 7 Drawing Sheets

THIN-FILM MAGNETIC HEAD HAVING HELICAL COILS AND MANUFACTURING METHOD FOR THE SAME

This application claims the benefit of priority to Japanese Patent Application No. 2003-066198, herein incorporated by reference.

BACKGROUND OF THE INVENTION

1. Field of the Invention

The present invention relates to a thin-film magnetic head for recording used in, for example, a floating magnetic head and, more particularly, to a thin-film magnetic head that features a toroidal coil configuration having lower resistance in connection between first coil segments and second coil segments and permits easy formation of the second coil segments, and a manufacturing method for the same.

2. Description of the Related Art

FIG. 12 shows a transferred partial front view of a thin-film magnetic head disclosed in Patent Document 1 (U.S. Pat. No. 6,275,354B1) described below.

The thin-film magnetic head shown in FIG. 12 is a "stitched pole type" thin-film magnetic head, in which a lower core layer 2, an insulating layer 3, a pole chip 4, and an upper core layer 5 are deposited on a substrate 1 in this order from the bottom, and a coil layer 6 is wound around the upper core layer 5.

In the pole chip 4, a lower magnetic pole layer 4a and an upper magnetic pole layer 4c are laminated with a gap layer 4b sandwiched therebetween.

The coil layer 6 is helically wrapped around the upper core layer 5, as shown in FIG. 12.

The coil layer 6 is constructed of a first coil segment 6a positioned above the lower core layer 2, a second coil segment 6b positioned above the upper core layer 5, and a side coil segment 6c, which is positioned beside the upper core layer 5 and formed continually from the first coil segment 6a and the second coil segment 6b.

In FIG. 12, the insulating layer 3 is formed between the first coil segment 6a and the second coil segment 6b. The first coil segment 6a penetrates the insulating layer 3 in parallel to the upper surface of the substrate 1. Hence, the first coil segment 6a is electrically isolated from the upper core layer 5 through the intermediary of the insulating layer 3.

FIG. 13 is a transferred longitudinal sectional view of a magnetic head disclosed in Patent Document 2 (U.S. Pat. No. 6,163,435) described below.

Referring to FIG. 13, a lower core layer 12 has a protuberant portion 12a that projects in a direction of Z in the figure on a surface side opposing a recording medium. A magnetic pole 17 is formed on the opposing surface side of the protuberant portion 12a.

As shown in FIG. 13, the lower core layer 12 has a back gap layer 13 formed near the back thereof in a height direction (Y-direction in the figure). A part of the coil layer 14 is accommodated between the protuberant portion 12a and the back gap layer 13. The coil layer 14 is encompassed by the insulating layer 15, and an upper surface 12b of the protuberant portion 12a, an upper surface 15a of the insulating layer 15, and an upper surface 13a of the back gap layer 13 are all flush, forming a planarized surface.

An insulating layer 16 is formed on the planarized surface formed by the upper surface 12b of the protuberant portion 12a, an upper surface 15a of the insulating layer 15, and an upper surface 13a of the back gap layer 13.

In the thin-film magnetic head disclosed in Patent Document 1 above, the side coil segment 6c substantially functions as a connection of the first coil segment 6a and the second coil segment 6b. However, no specific structure of the side coil segment 6c has been described.

Meanwhile, in the magnetic head disclosed in Patent Document 2, the insulating layer 16 is used merely to isolate the coil layer. Furthermore, the core structure around the magnetic gap of the thin-film magnetic head disclosed in Patent Document 2 above has been disadvantageous in achieving a narrower gap.

SUMMARY OF THE INVENTION

Accordingly, the present invention has been made with a view toward solving the problem with the aforesaid prior technology, and it is an object of the present invention to provide a thin-film magnetic head that has a magnetic pole structure allowing a narrower gap to be achieved and that makes it possible to reduce resistance in connection between a first coil segment and a second coil segment, and a manufacturing method for the same.

To this end, one aspect of the present invention provides a thin-film magnetic head having a lower core layer which is formed such that it extends in a height direction from a surface opposing a recording medium and on which a protuberant layer formed over a predetermined length in the height direction from the surface opposing a recording medium and a back gap layer formed in the height direction such that it is away from a rear end surface of the protuberant layer by a predetermined distance in the height direction are deposited;

a magnetic pole layer that connects the protuberant layer and the back gap layer, a track width Tw thereof being determined by a width dimension in the direction of track width at the surface opposing a recording medium; and a coil layer helically encompassing the magnetic pole layer, wherein a plurality of first coil segments extending in directions in which they cross the magnetic pole layer is formed in the height direction with intervals provided thereamong in a space encompassed by the lower core layer, the protuberant layer, and the back gap layer, a coil insulating layer being provided among the first coil segments, an upper surface of the protuberant layer, upper surfaces of the first coil segments, and an upper surface of the back gap layer form a continuous planarized surface, a Gd-determining layer (where Gd refers to "gap depth" and refers to a distance a gap extends away from the surface opposing the recording medium) composed of an insulating material is formed to cover the upper surfaces of the first coil segments from a position apart in the height direction by a predetermined distance from the surface opposing a recording medium, a magnetic pole layer having a gap layer provided on the protuberant layer positioned closer to the surface opposing a recording medium than the Gd-determining layer is, and an upper magnetic pole layer deposited, beginning from the upper surface of the gap layer through the Gd-determining layer onto the back gap layer, and a plurality of second coil segments across the upper surface of the magnetic pole layer through the intermediary of the insulating layer is deposited on the magnetic pole layer with intervals provided thereamong in the height direction, and ends of adjacent ones of the first coil segments are connected through the intermediary of the second coil segments so as to form the helically wound coil layer.

In the thin-film magnetic head according to the present invention, the Gd-determining layer is formed, covering the upper surfaces of the first coil segments, and the magnetic pole layer is deposited on the Gd-determining layer. The Gd-determining layer is made of an insulating material, so that the first coil segments and the magnetic pole layer can be insulated by the Gd-determining layer. Hence, the thin-film magnetic head obviates the need for providing an insulating layer for insulation between the first coil segments and the magnetic pole layer separately from the Gd-determining layer. This makes it possible to simplify the construction of a thin-film magnetic head.

The upper surfaces of the first coil segments formed in the space encompassed by the lower core layer, the protuberant layer, and the back gap layer, and the upper surfaces of the protuberant layer and the back gap layer are formed into a continuous planarized surface. The Gd-determining layer is deposited on the planarized surface. Therefore, the upper surface of the Gd-determining layer is automatically flat, and the upper magnetic pole layer can be formed to have a flat configuration on the Gd-determining layer. This permits improved flux flow to be achieved. Moreover, the upper magnetic pole layer can be accurately formed into a predetermined shape, making it possible to accomplish a thin-film magnetic head capable of successfully achieving a higher recording density.

Furthermore, since the upper surfaces of the first coil segments can be made flush with the upper surfaces of the protuberant layer and the back gap layer, the film thickness of the first coil segments can be set to a maximum within a range in which the first coil segments can be accommodated in the space encompassed by the lower core layer, the protuberant layer, and the back gap layer. Thus, a resistance value of the first coil segments can be reduced, so that their power consumption can be reduced, permitting a reduction in heat generated from the coil layer. Reduced heat generated from the coil layer makes it possible to control the occurrence of the problem of "bulging," in which the surface of a thin-film magnetic head that opposes a recording medium bulges due to thermal expansion and comes in contact with the recording medium.

In this case, preferably, a lower magnetic pole layer having a smaller width than a width in the direction of track width of the protuberant layer is provided under the gap layer.

With this arrangement, magnetic fluxes flowing through the upper magnetic pole layer and the gap layer can be concentrated between the upper magnetic pole layer and the lower magnetic pole layer, permitting a narrower gap to be achieved.

Preferably, the lower magnetic pole layer, the gap layer, and the upper magnetic pole layer are formed by plating.

Forming the three layers by plating allows a narrower track to be accomplished without the need for a step of trimming the gap layer and the lower magnetic pole layer by milling or the like.

Alternatively, one end of each of the first coil segments and one end of each of the second coil segments may be positioned beside the Gd-determining layer and connected through the intermediary of connection layers formed on the first coil segments.

With this arrangement, the second coil segments do not have to be considerably curved so as to have their ends on one side directed downward (toward the first coil segments) to connect the second coil segments to the first coil segments. This allows the second coil segments to be formed easily. Moreover, the first coil segments and the second coil segments can be connected securely and easily.

The connection layers may be formed of the same material layer as the lower magnetic pole layer, the same material layer as the gap layer, and the same material layer as the upper magnetic pole layer in this order from bottom.

With this arrangement, the connection layers can be formed simultaneously with the lower magnetic pole layer, the gap layer, and the upper magnetic pole layer. This permits easier manufacture and improved product reliability to be accomplished.

The same material layer as the lower magnetic pole layer, the same material layer as the gap layer, and the same material layer as the upper magnetic pole layer are formed by plating.

With this arrangement, the connection layers can be formed by plating at the same time when the lower magnetic pole layer, the gap layer, and the upper magnetic pole layer are formed, thus permitting easier manufacture. Moreover, forming the connection layers by plating allows the connection layers to be formed to predetermined dimensions with high accuracy, so that the first coil segments and the second coil segments can be securely connected.

Preferably, the lower magnetic pole layer and the gap layer are formed on the planarized surface farther toward the rear in the height direction than the Gd-determining layer, and the upper magnetic pole layer is deposited on the gap layer.

With this arrangement, the upper magnetic pole layer can be planarized also in a region located farther toward the rear in the height direction than the Gd-determining layer.

Alternatively, the upper magnetic pole layer, the gap layer, and the lower magnetic pole layer may be formed to have the same planar configuration, and a width of the upper magnetic pole layer in the direction of the track width at the surface opposing a recording medium may determine the track width Tw.

In the thin-film magnetic head in accordance with the present invention, the lower magnetic pole layer, the gap layer, and the upper magnetic pole layer can be deposited on the planarized surface, so that these layers can be formed to predetermined configurations with high accuracy, and the track width Tw determined by the width dimension of the surface opposing a recording medium of the upper magnetic pole layer can be easily set to a predetermined dimension. This makes it possible to fabricate a thin-film magnetic head that successfully allows a higher recording density to be achieved.

Alternatively, an upper core layer may be deposited on the upper magnetic pole layer.

This arrangement makes a yoke portion larger, permitting improved recording characteristics to be accomplished.

In this case, the connection layers can be formed by depositing the same material layer as the upper core layer on the same material layer as the magnetic pole layer.

Preferably, the thickness of the Gd-determining layer is equal to a total thickness of the lower magnetic pole layer and the gap layer.

This arrangement makes it possible to bring the upper surfaces of the connection layers and the magnetic pole layer to be flush upon completion of layer formation when the connection layers and the magnetic pole layer are simultaneously formed, thus permitting the second coil segment to be easily formed.

Furthermore, since the upper surface of the gap layer and the upper surface of the Gd-determining layer become flush, the upper magnetic pole layer can be deposited on a planarized surface. Thus, the upper magnetic pole layer can be planarized, making it possible to shorten a magnetic path, reduce inductance, and improve stability of magnetic flux flow.

Another aspect of the present invention provides a manufacturing method for a thin-film magnetic head, including:

(a) a step for extending a lower core layer in a height direction from a surface opposing a recording medium;

(b) a step for depositing a coil insulating base layer on the lower core layer, then forming a plurality of first coil segments extending in a direction in which they intersect with a magnetic pole layer, which is formed in step (g) to be discussed later, on the coil insulating base layer in a predetermined region with intervals provided in the height direction;

(c) a step for forming a protuberant layer on the lower core layer at a position where it does not contact front end surfaces of the first coil segments that are adjacent to the surface opposing a recording medium from the surface opposing a recording medium in the height direction before or after the step (b), then forming a back gap layer on the lower core layer at a position where the back gap layer is apart in the height direction from a rear end surface of the protuberant layer in the height direction and it does not come in contact with the first coil segments;

(d) a step for filling the gaps among the first coil segments with a coil insulating layer;

(e) a step for grinding an upper surface of the protuberant layer, upper surfaces of the first coil segments, and an upper surface of the back gap layer to form the upper surfaces into a continuous planarized surface;

(f) a step for forming a Gd-determining layer made of an insulating material, which covers the first coil segments from a position apart by a predetermined distance in the height direction from the surface opposing a recording medium;

(g) a step for forming a magnetic pole layer having a lower magnetic pole layer and a gap layer provided on the protuberant layer, which is closer to the surface opposing a recording medium than the Gd-determining layer is, and an upper magnetic pole layer formed, beginning from the upper surface of the gap layer through the upper surface of the Gd-determining layer to the upper surface of the back gap layer; and (h) a step for forming an insulating layer on the magnetic pole layer, then forming a plurality of second coil segments across the magnetic pole layer in the height direction with intervals provided among them, and connecting ends of adjacent first coil segments through the intermediary of the second coil segments so as to form a helically wound coil layer.

In the manufacturing method according to the present invention, the Gd-determining layer is formed to cover the upper surface of the first coil segments, and then the magnetic pole layer is deposited on the Gd-determining layer. Since the Gd-determining layer is made of an insulating material, the first coil segments and the magnetic pole layer are insulated from each other by the Gd-determining layer. Hence, the thin-film magnetic head obviates the need for providing an insulating layer for insulating the first coil segments and the magnetic pole layer from each other separately from the Gd-determining layer. This makes it easier to fabricate the thin-film magnetic head.

The upper surfaces of the first coil layer formed in a space encompassed by the lower core layer, the protuberant layer, and the back gap layer and the upper surfaces of the protuberant layer and the back gap layer are formed into a continuous planarized surface, and the Gd-determining layer is formed on the planarized surface. Therefore, the upper surface of the Gd-determining layer is also flat, allowing the upper magnetic pole layer to have a flat shape on the Gd-determining layer. This makes it possible to manufacture thin-film magnetic heads permitting a smooth flow of magnetic fluxes. Moreover, since the upper magnetic pole layer can be formed to a predetermined configuration with high accuracy, making it possible to fabricate a thin-film magnetic head capable of achieving a higher recording density.

Since the upper surfaces of the first coil segments can be made flush with the upper surfaces of the protuberant layer and the back gap layer, the film thickness of the first coil segments can be set to a maximum within a range in which the first coil segments can be accommodated in the space encompassed by the lower core layer, the protuberant layer, and the back gap layer. Thus, a resistance value of the first coil segments can be reduced, so that their power consumption can be reduced, permitting a reduction in heat generated from the coil layer. Reduced heat generated from the coil layer makes it possible to control the occurrence of the problem of "bulging," in which the surface of a thin-film magnetic head that opposes a recording medium bulges due to thermal expansion and comes in contact with the recording medium.

In this case, preferably, a lower magnetic pole layer having a smaller width than a width in the direction of track width of the protuberant layer is provided under the gap layer in the step (g).

With this arrangement, magnetic fluxes flowing through the upper magnetic pole layer and the gap layer can be concentrated between the upper magnetic pole layer and the lower magnetic pole layer, permitting a narrower gap to be achieved. This makes it possible to fabricate a thin-film magnetic head that permits a narrower gap to be achieved.

Preferably, the manufacturing method includes a step (i) for forming connection layers positioned beside the Gd-determining layer and on the first coil segments at the same time or before or after the step (f).

With this arrangement, one end of each of the second coil segments will not significantly curve downwards (toward the first coil segments) when the second coil segments are connected to the first coil segments. This allows the second coil segments to be formed easily. Moreover, the first coil segments and the second coil segments can be connected securely and easily.

In the step (i), the connection layers may be formed of the same material layer as the lower magnetic pole layer, the same material layer as the gap layer, and the same material layer as the upper magnetic pole layer in this order from bottom.

With this arrangement, the connection layers can be formed simultaneously with the lower magnetic pole layer, the gap layer, and the upper magnetic pole layer. This permits easier manufacture.

In the step (g), the lower magnetic pole layer, the gap layer, and the upper magnetic pole layer can be successively formed by plating.

This arrangement makes it possible to achieve a narrower track without the need for a step for trimming the gap layer and the lower magnetic pole layer by milling or the like.

In this case, the same material layer as the lower magnetic pole layer, the same material layer as the gap layer, and the same material layer as the upper magnetic pole layer are preferably formed in succession by plating in the step (i).

With this arrangement, the connection layers can be easily fabricated.

Preferably, the upper core layer is deposited on the magnetic pole layer after the step (g).

This arrangement makes it possible to fabricate a thin-film magnetic head having a larger yoke, so that a thin-film magnetic head with improved recording characteristics can be obtained.

After the step (g), the same material layer as the upper core layer may be deposited on the same material layer as the magnetic pole layer of the connection layers.

Preferably, a total thickness of the lower magnetic pole layer and the gap layer is set to the same thickness of the Gd-determining layer in the step (g).

This arrangement makes it possible to bring the upper surfaces of the connection layers and the magnetic pole layer to be flush upon completion of layer formation when the connection layers and the magnetic pole layer are simultaneously formed, thus permitting the second coil segments to be easily formed.

Furthermore, since the upper surface of the gap layer and the upper surface of the Gd-determining layer become flush, the upper magnetic pole layer can be deposited on a planarized surface. Thus, the upper magnetic pole layer can be planarized, making it possible to shorten a magnetic path, reduce inductance, and improve stability of magnetic flux flow.

DESCRIPTION OF THE PREFERRED EMBODIMENTS

Figure 1:
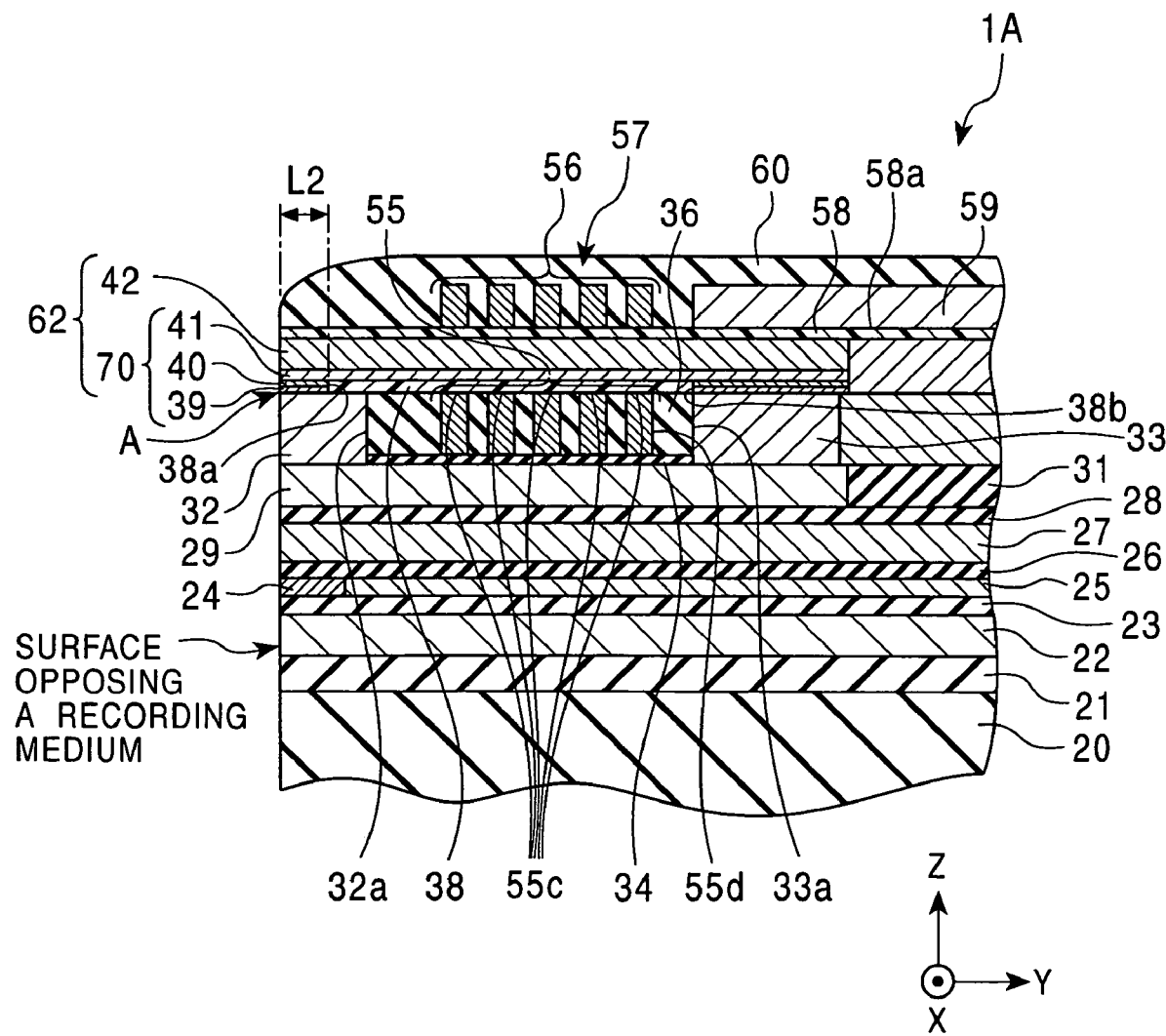
FIG. 1 is a partial longitudinal sectional view showing a construction of a thin-film magnetic head according to a first embodiment of the present invention.
Figure 2:
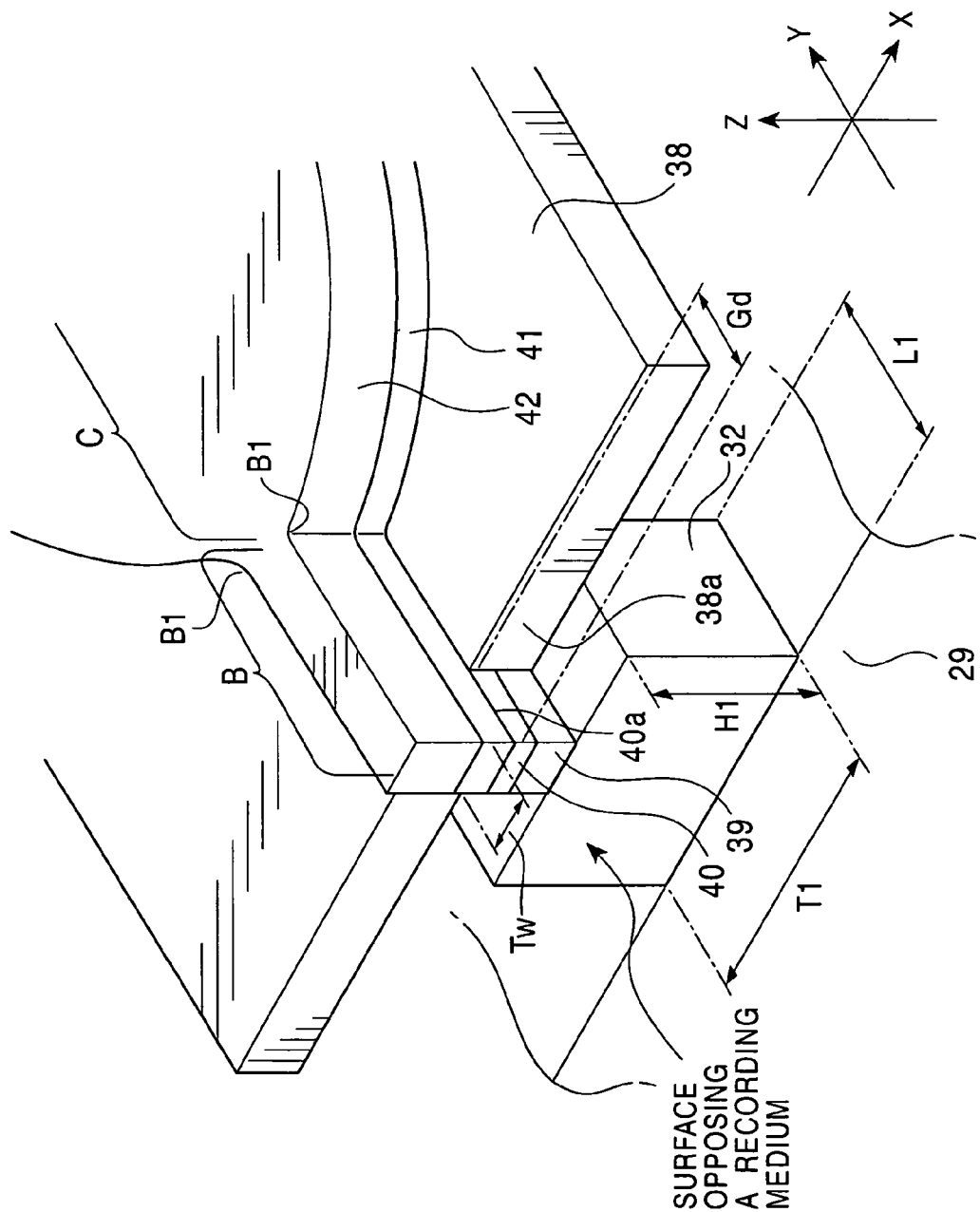
FIG. 2 is a partially enlarged perspective view of the thin-film magnetic-head shown in FIG. 1.
Figure 3:
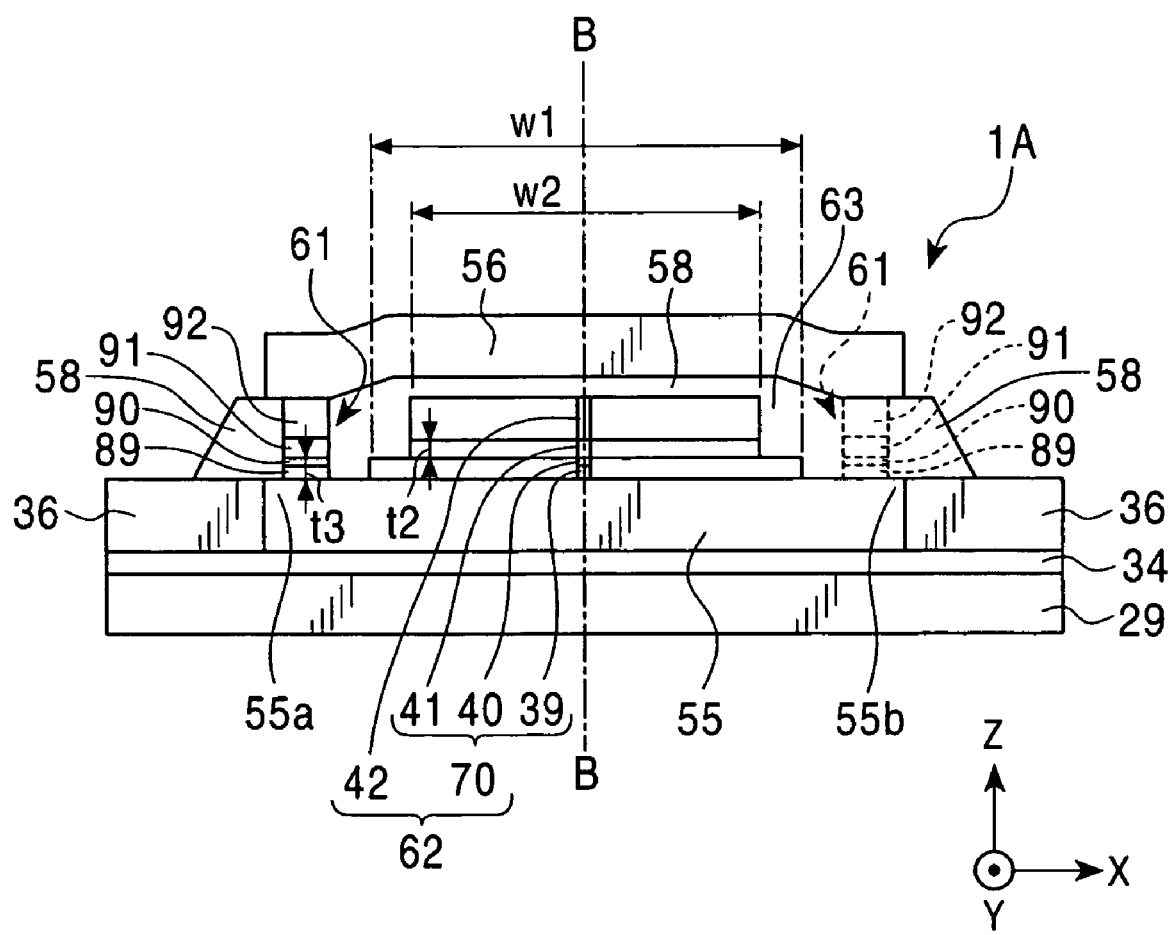
FIG. 3 is a partial front view of the thin-film magnetic head shown in FIG. 1.
Figure 4:
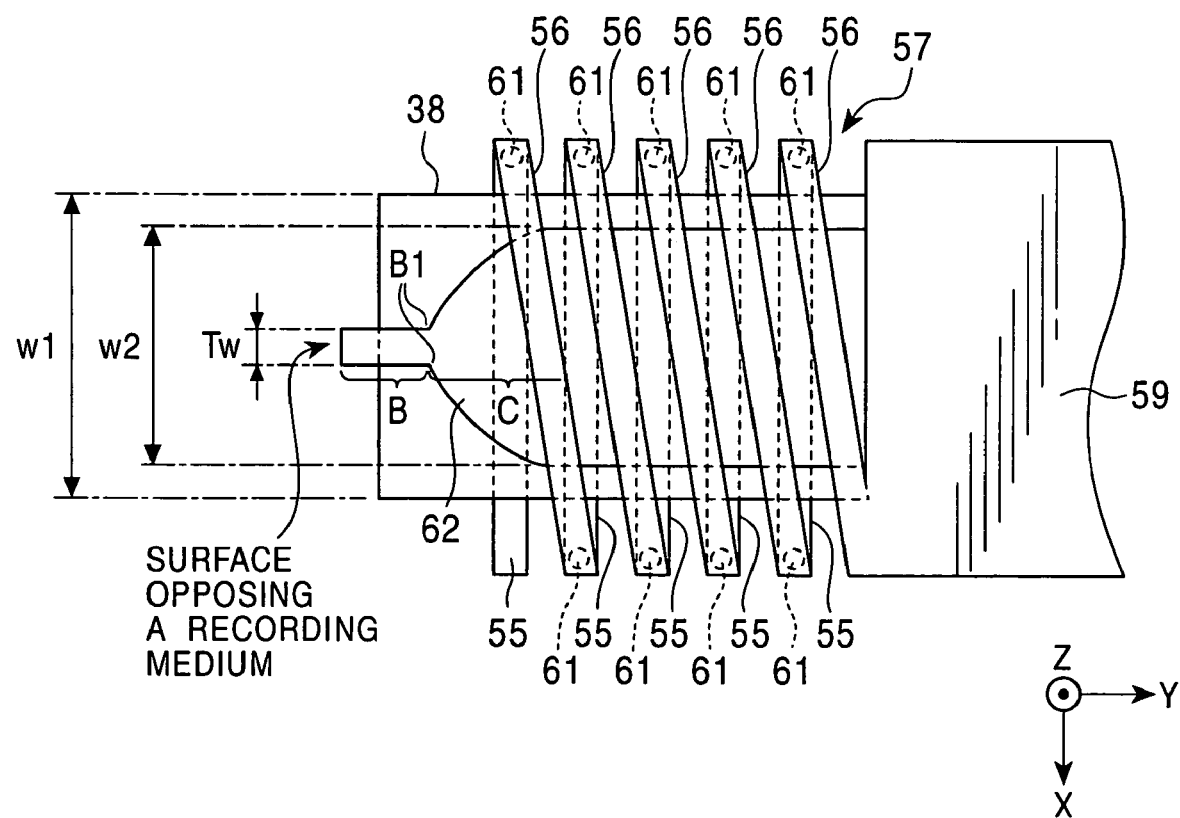
FIG. 4 is a partial top plan view of the thin-film magnetic head shown in FIG. 1.

FIG. 1 is a longitudinal sectional view showing a construction of a thin-film magnetic head 1A according to a first embodiment of the present invention. FIG. 2 is a partially enlarged perspective view showing a partial construction of the thin-film magnetic head 1A shown in FIG. 1. FIG. 3 is a partial front view of the thin-film magnetic head 1A shown in FIG. 1. FIG. 4 is a partial top plan view of the thin-film magnetic head 1A shown in FIG. 1.

Hereinafter, a direction X shown in the figures will be referred to as the track width direction, while a direction Y shown in the figures will be referred to as the height direction. A direction Z shown in the figures indicates the direction in which a recording medium, namely, a magnetic disk, travels. The front end surface (the leftmost surface in the figure) of the thin-film magnetic head will be referred to as "the surface opposing a recording medium."

A substrate 20 is formed of alumina-titanium carbide ($Al_2O_3$—TiC) or the like, and an $Al_2O_3$ layer 21 is deposited on the substrate 20.

A lower shielding layer 22 formed of a NiFe-based alloy or sendust or the like is deposited on the $Al_2O_3$ layer 21. A lower gap layer 23 formed of $Al_2O_3$ or the like is deposited on the lower shielding layer 22.

In the vicinity of the surface opposing a recording medium, a magnetoresistive element 24 typically represented by a GMR element, such as a spin valve thin-film element, is formed on the lower gap layer 23. An electrode layer 25 extending in the height direction (the Y-direction in the figures) is formed on both sides of the magnetoresistive element 24 in the track width direction (the X-direction in the figure).

An upper gap layer 26 formed of $Al_2O_3$ or the like is deposited on the magnetoresistive element 24 and the electrode layer 25. An upper shielding layer 27 formed of a NiFe-based alloy or the like is deposited on the upper gap layer 26.

The portion extending from the lower shielding layer 22 to the upper shielding layer 27 is referred to as a reproducing head or an MR head.

Referring to FIG. 1, a separating layer 28 formed of $Al_2O_3$ or the like is deposited on the upper shielding layer 27. Alternatively, a lower core layer 29 may be directly deposited on the upper gap layer 26 without providing the upper shielding layer 27 and the separating layer 28. In this case, the lower core layer 29 serves also as the upper shielding layer.

The lower core layer 29 is deposited on the separating layer 28. The lower core layer 29 is made of a magnetic material, such as a NiFe-based alloy. The lower core layer 29 is formed over a predetermined length in the height direction (the Y-direction in the figure) from the surface opposing a recording medium.

A protuberant layer 32 is formed on the lower core layer 29 over a predetermined length L1 (refer to FIG. 2) in the height direction (the Y-direction in the figure) from the surface opposing a recording medium. Furthermore, a back gap layer 33 is deposited on the lower core layer 29 at a predetermined distance in the height direction (the Y-direction in the figure) from a rear end surface 32a of the protuberant layer 32 with respect to the height direction.

The protuberant layer 32 and the back gap layer 33 are formed of a magnetic material, and they may be formed of the same material as that used for the lower core layer 29 or a different material. Each of the protuberant layer 32 and the back gap layer 33 may be constructed of a single layer or a laminated construction made of multiple layers. The protuberant layer 32 and the back gap layer 33 are magnetically connected to the lower core layer 29.

Referring to FIG. 1, a coil insulating base layer 34 is deposited on the lower core layer 29 in a space encompassed by the lower core layer 29, the protuberant layer 32, and the back gap layer 33. A plurality of first coil segments 55 is formed on the coil insulating base layer 34 in the height direction with intervals provided among them.

The gaps among the plural first coil segments 55 are filled with a coil insulating layer 36 made of $Al_2O_3$ or the like to provide insulation.

Preferably, a resist layer is formed to fill in the gaps among first coil segments 55 before the coil insulating layer 36 is formed. Forming the resist layer makes it possible to restrain the coil insulating layer 36 from becoming porous.

As shown in FIG. 1, the upper surface of the protuberant layer 32, upper surfaces 55c of the first coil segments 55, the upper surface of the coil insulating layer 36, and the upper surface of the back gap layer 33 form a continuous planarized surface along a reference surface A shown in FIG. 1.

Furthermore, a Gd-determining layer 38 formed of an insulating material is deposited on the planarized surface in the height direction from a point of a minimum distance L2 away from the surface opposing a recording medium in the height direction (the Y-direction in the figure).

A front end surface 38a of the Gd-determining layer 38 is on the protuberant layer 32, while a rear end surface 38b of the Gd-determining layer 38 is positioned on the same surface as a front end surface 33a of the back gap layer 33 in the height direction. As shown in FIG. 3, the Gd-determining layer 38 has a predetermined width W1, with a central line B—B dividing the thin-film magnetic head 1A in two in the track width direction. The Gd-determining layer 38 is deposited to cover the upper surfaces 55c of the first coil segments 55.

The rear end surface 38b of the Gd-determining layer 38 may alternatively be positioned on the upper surface of the back gap layer 33. Alternatively, the rear end surface 38b of the Gd-determining layer 38 may be positioned on the coil insulating layer 36 between a rear end 55d of the first coil segments 55 accommodated in the space encompassed by the protuberant layer 32, the lower core layer 29, and the back gap layer 33, and the front end surface 33a in the height direction of the back gap layer 33.

A lower magnetic pole layer 39 and a gap layer 40 are deposited in this order from bottom on the protuberant layer 32 from the surface opposing a recording medium to the front end surface 38a of the Gd-determining layer 38 and on the back gap layer 33. In the present embodiment, the lower magnetic pole layer 39 and the gap layer 40 are formed by plating. Furthermore, as shown in FIG. 1, an upper magnetic pole layer 41 is deposited by plating on the gap layer 40 and the Gd-determining layer 38. The lower magnetic pole layer 39, the gap layer 40, and the upper magnetic pole layer 41 form a magnetic pole layer 70. An upper core layer 42 is deposited by plating on the upper magnetic pole layer 41.

Preferably, the lower magnetic pole layer and the gap layer are deposited on the planarized surface on the farther rear side than the Gd-determining layer with respect to the height direction, and the upper magnetic pole layer is deposited on the gap layer, as shown in FIG. 1. Thus, the upper magnetic pole layer can be planarized also in the region on the further rear side from the Gd-determining layer with respect to the height direction.

According to the present invention, the lower magnetic pole layer 39 is dispensable. However, providing the lower magnetic pole layer 39 allows magnetic fluxes flowing through the upper magnetic pole layer and the gap layer to be concentrated between the upper magnetic pole layer and the lower magnetic pole layer, thus permitting a narrower gap to be achieved. Preferably, therefore, the lower magnetic pole layer 39 is provided to accomplish a reduced gap. Similarly, although the upper core layer 42 is dispensable, it is preferred to provide the upper core layer 42, because layers with high saturation flux density, such as the upper magnetic pole layer 41 and the lower magnetic pole layer 39, have an extremely slow plating growth rate, so that it is difficult to obtain a large thickness. Meanwhile, the upper core layer 42, which does not require a high saturation flux density as required by the upper magnetic pole layer 41 and the lower magnetic pole layer 39, so that it can be formed to have a large thickness under easier plating conditions because of a lower flux density required. Thus, providing the upper core layer 42 makes it possible to improve recording performance.

In the embodiment shown in FIG. 1, the protuberant layer 32 is formed separately from the lower core layer 29 and magnetically connected to the lower core layer 29. Alternatively, the protuberant layer 32 may be formed integrally with the lower core layer 29. The protuberant layer 32 may be formed of the same material used for the lower core layer 29, or formed of a different material. The protuberant layer 32 may be constructed of a single layer or a laminate having multiple layers.

Referring now to FIG. 2, a width T1 in the track width direction (the X-direction in the figure) of the protuberant layer 32 at the surface opposing a recording medium is set to be larger than the widths of the portions of the lower magnetic pole layer 39, the gap layer 40, the upper magnetic pole layer 41, and the upper core layer 42 deposited in this order on the protuberant layer 32, the portions being the surfaces opposing a recording medium. The width T1 ranges from about 5 µm to about 30 µm. Length L1 of the protuberant layer 32 in the height direction ranges from about 1 µm to about 3 µm. Thickness H1 of the protuberant layer 32 ranges from about 2.5 µm to about 4 µm.

Preferably, the lower magnetic pole layer 39 and the upper magnetic pole layer 41 have higher saturation flux densities Bs than those of the upper core layer 42, the lower core layer 29, the protuberant layer 32, and the back gap layer 33. The high saturation flux densities of the lower magnetic pole layer 39 and the upper magnetic pole layer 41 opposing the gap layer 40 cause recording magnetic fields to be concentrated in the vicinity of the gap, making it possible to achieve a higher recording density.

For the lower magnetic pole layer 39 and the upper magnetic pole layer 41, a magnetic material, such as a NiFe alloy, a CoFe alloy, a FeCoRh alloy, or a CoFeNi alloy, may be used. High saturation flux densities Bs can be obtained by adjusting the composition ratio of the magnetic materials. In the present embodiment, the high saturation flux densities Bs mean saturation flux densities of 1.8 T or more.

The lower magnetic pole layer 39 and the upper magnetic pole layer 41 may be constructed of a single layer or a laminate formed of multiple layers.

The gap layer 40 shown in FIG. 1 is formed of a nonmagnetic metal material, and deposited on the lower magnetic pole layer 39 by plating. Preferably, as the nonmagnetic metal material, one type or two or more types may be selected from among NiP, NiReP, NiPd, NiW, NiMo, NiRh, Au, Pt, Rh, Pd, Ru, and Cr. The gap layer 40 may be constructed of a single layer or multiple layers.

Forming the gap layer 40 using a NiP alloy permits easier continuous plating in manufacture, higher heat resistance, and better adhesion between the lower magnetic pole layer 39 and the upper magnetic pole layer 41. The hardness of the lower magnetic pole layer 39 and the upper magnetic pole layer 41 can be set to the same level, so that the machining amounts for machining the surfaces opposing a recording medium of the lower magnetic pole layer 39, the gap layer 40, and the upper magnetic pole layer 41, respectively, can be set to the same amount by, for example, ion milling or the like. This permits improved machinability.

Preferably, the gap layer 40 is made of a NiP alloy, and the concentration of an element P ranges from 8 percent by mass to 15 percent by mass. This makes it possible to secure stability and nonmagnetism against external factors, such as generated heat. The composition of an alloy, such as a NiP alloy, used for the gap layer 40 can be measured using an X-ray analyzer or a waveform distributed type line analyzer or the like combined with a scanning electron microscopy (SEM) and a transmission electron microscopy (TEM) or the like.

The upper core layer 42 is formed of a magnetic material equivalent to that used for the lower core layer 29 or the like, and may be constructed of a single layer or a laminate of multiple layers.

The film thickness of the upper core layer 42 ranges from about 1 µm to about 3 µm. The film thickness of the lower magnetic pole layer 39 ranges from about 0.1 µm to about 0.5 µm. The film thickness of the gap layer 40 ranges from about 0.05 µm to about 0.15 µm. The film thickness of the upper magnetic pole layer 41 ranges from about 0.1 µm to about 1 µm.

Preferably, the lower magnetic pole layer, the gap layer, and the upper magnetic pole layer are formed by plating. Forming these three layers by plating makes it possible to accomplish a narrower track without the need for trimming the gap layer and the lower magnetic pole layer by milling or the like.

A four-layer laminate 62 constructed of the lower magnetic pole layer 39, the gap layer 40, the upper magnetic pole layer 41, and the upper core layer 42 can be formed by completely by plating, and all the four layers of the laminate 62 can be plated using the same frame, thus permitting extremely easy formation. The track width Tw determined by the width of the surface opposing a recording medium of the upper magnetic pole layer 41, in particular, can be controlled to a predetermined dimension with high accuracy, obviating the conventional need for reducing the track width Tw by trimming or the like. Moreover, since these four layers can be plated using the same frame, the planes of all layers of the four-layer laminate 62 can be formed to have the same configurations.

FIG. 2 is a perspective view of one example of the four-layer laminate. The planes of the surfaces opposing a recording medium of the lower magnetic pole layer 39, the gap layer 40, the upper magnetic pole layer 41, and an upper core layer 42 include distal portions B that have a predetermined width in the track width direction (the X-direction in the figure) and extend in the height direction (the Y-direction in the figure) while maintaining the width, and rear end portions C whose widths in the track width direction gradually increase in the height direction from proximal ends B1 and B1 on both sides of the distal portions B. As described above, the width in the track width direction (the X-direction in the figure) of the surface opposing a recording medium of the upper magnetic pole layer 41 restricts the track width Tw.

The distal end portions B may be shaped such that their width in the track width direction gradually increases in the height direction from the surfaces opposing a recording medium. In such a case, the rear end portions C are formed such that their width in the track width direction further increases in the height direction from the proximal ends B1 on both sides of the distal end portions B.

Regarding the positional relationship between the proximal ends B1 on both sides of the distal portions B and the Gd-determining layer 38, the proximal ends B1 on both sides of the distal portions B are positioned farther in the height direction than the rear end surface 38b of the Gd-determining layer 38 in FIGS. 1 and 2. Alternatively, however, the proximal ends B1 on both sides may be positioned on the Gd-determining layer 38 or more closely to the surface opposing a recording medium than the front end surface 38a of the Gd-determining layer 38 is.

As shown in FIG. 2, the gap depth (Gd) is determined by a length in the height direction (the Y-direction in the figure) from the surface opposing a recording medium of the upper surface 40a of the gap layer 40 to the Gd-determining layer 38.

Preferably, a minimum distance L2 (refer to FIG. 1) in the height direction (the Y-direction in the figure) between the front end surface 38a of the Gd-determining layer 38 and the surface opposing a recording medium ranges from about 0.5 µm to about 2.0 µm. The gap depth (Gd) preferably ranges from about 0.5 µm to about 2.0 µm.

The Gd-determining layer 38 is rectangular in FIG. 2; however, it may alternatively have a semi-elliptical longitudinal section or any other shape. The Gd-determining layer 38 may be made of an organic material, such as a resist, or an inorganic material, as long as it is an insulating material. If a resist or the like is used for the Gd-determining layer 38, then a surface of the Gd-determining layer 38 will be roundish when applying heat.

As shown in FIGS. 1 and 3, an insulating layer 58 made of an insulating material, such as $Al_2O_3$ or a resist, is deposited on the four-layer laminate 62, which includes the lower magnetic pole layer 39, the gap layer 40, the upper magnetic pole layer 41, and the upper core layer 42. A plurality of the second coil segments 56 is formed on the insulating layer 58 with intervals provided among them.

The first coil segments 55 are formed such that they extend in the track width direction (the X-direction in the figure) in which they intersect with the magnetic pole layer 70. When viewed from right above, a plurality of the first coil segments 55 is arranged, for example, in parallel to the track width direction, as shown in FIG. 4. Meanwhile, the second coil segments 56 are formed such that they cross the magnetic pole layer 70. When viewed from right above, the second coil segments 56 are arranged, for example, at an angle with respect to the track width direction (the X-direction in the figure), as shown in FIG. 4. The plural second coil segments 56 are arranged in parallel to each other. The first coil segments 55 and the second coil segments 56 are not parallel to each other.

As shown in FIGS. 3 and 4, one end 55a of each of the first coil segments 55 and one end 56a of each of the second coil segments 56, which oppose each other in the direction of the film thickness (a Z-direction in the figure) of the four-layer laminate 62, are connected through the intermediary of connection layers 61 so as to connect the ends 55a of adjacent ones of the first coil segments 55 through the second coil segment 56. Similarly, the other end 55b of each of the first coil segments 55 and the other end 56b of each of the second coil segments 56, which oppose each other in the direction of the film thickness (a Z-direction in the figure) of the four-layer laminate 62, are connected through the intermediary of the connection layers 61 so as to connect the ends 55b of adjacent ones of the first coil segments 55 through the second coil segment 56.

Since the first coil segments 55 and the second coil segments 56 are connected through the intermediary of the connection layers 61, the ends 56a and 56b of the second coil segments 56 do not have to be significantly curved downwards (toward the first coil segments) to connect the second coil segments to the first coil segments. This allows the second coil segments to be formed easily. Moreover, the first coil segments and the second coil segments can be connected securely and easily.

The connection layers 61 indicated by a dashed line at right in FIG. 3 connects the end 55b of one of the first coil segments 55 that is positioned one segment behind (the Y-direction in the figure) the first coil segment 55 that is visible in the figure, by one to the end 56b of the second coil segment 56 that is visible in the figure.

Thus, the ends 55a and 55b of the first coil segments 55 and the ends of the second coil segments 56 that oppose each other in the direction of the film thickness of the four-layer laminate 62 are connected through the intermediary of the connection layers 61 so as to form a toroidal coil layer 57.

The coil layer in accordance with the present invention is not limited to the one that has a plurality of the first coil segments 55 that are arranged in parallel to each other, and a plurality of the second coil segments 56 that are also arranged in parallel to each other, as shown in FIG. 4.

More specifically, the present invention can be applied as long as the first coil segments 55 are formed to extend in a direction in which they cross the magnetic pole layer 70 in the space encompassed by the lower core layer 29, the protuberant layer 32, and the back gap layer 33, the second coil segments 56 are formed across the upper surface of the magnetic pole layer 70, and adjacent ends of the first coil segments 55 are connected through the second coil segments 56 so as to form the helically wound coil layer 57.

Another configuration may be applied, wherein, for example, the plural first coil segments 55 are not formed to be parallel to each other, the plural second coil segments 56 are arranged such that only the portions overlapping the magnetic pole layer 70 are parallel to each other, and the portions positioned on both sides in the track width direction (the X-direction in the figure) of the magnetic pole layer 70 spread such that the distance in the height direction (the Y-direction in the figure) increases toward the ends 56a and 56b.

In addition to increasing the distances among the second coil segments 56 from a region overlapping the magnetic pole layer 70 to the ends 56a and 56b, it is possible to apply the same configuration also to the first coil segments 55 or only to the first coil segments 55.

In the region overlapping the magnetic pole layer 70, the first coil segments 55 and the second coil layer may not have any portions arranged to be parallel to each other.

This arrangement permits easy formation of the ends 56a and 56b of the second coil segments 56, and the ends 55a and 55b of the first coil segments 55 and the ends 56a and 56b of the second coil segments 56 can be connected easily and securely.

A layer 60 shown in FIG. 1 is a protective layer formed of $Al_2O_3$. A layer 59 shown in FIGS. 1 and 4 is a leader layer, and formed in the same step for forming the second coil segments 56.

The following will describe characteristic aspects of the thin-film magnetic head 1A.

In the thin-film magnetic head 1A, the upper surface of the protuberant layer 32, the upper surfaces 55c of the first coil segments 55, the upper surface of the coil insulating layer 36, and the upper surface of the back gap layer 33 are planarized. This means that the lower magnetic pole layer 39, the gap layer 40, the upper magnetic pole layer 41, the Gd-determining layer 38, and the upper core layer 42 can be deposited on the planarized surfaces. The upper surface of the Gd-determining layer 38, in particular, will be flat, allowing the upper magnetic pole layer to be planarized on the Gd-determining layer 38. Thus, the flow of magnetic fluxes in the upper magnetic pole layer 41 can be improved.

The upper surfaces of the first coil segments 55 can be set to be flush with the upper surfaces of the protuberant layer 32 and the back gap layer 33. Therefore, the film thickness of the first coil segments 55 can be maximized within a range in which the first coil segments 55 can be accommodated in the space encompassed by the lower core layer 29, the protuberant layer 32, and the back gap layer 33. Thus, a resistance value of the first coil segments 55 can be reduced, so that their power consumption can be reduced, permitting a reduction in heat generated from the coil layer. Reduced heat generated from the coil layer makes it possible to restrain the occurrence of the problem of "bulging," in which the surface of a thin-film magnetic head that opposes a recording medium bulges due to thermal expansion and comes in contact with the recording medium.

Furthermore, the upper magnetic pole layer 41 and the like can be accurately formed to predetermined configurations, making it possible to fabricate a thin-film magnetic head ideally suited for achieving a higher recording density. Especially because the width of the upper magnetic pole layer 41 in the track width direction (the X-direction in the figure) at the surface opposing a recording medium is restricted in terms of the track width Tw. Thus, the track width Tw can be restricted to a predetermined dimension with high accuracy since the upper magnetic pole layer 41 can be deposited on the planarized surface. In the present embodiment, the track width Tw can be set within a range of 0.0.1 µm to 0.3 µm.

Moreover, the upper surface of the protuberant layer 32 and the upper surface of the back gap layer 33 are connected through the linear four-layer laminate 62 to form a magnetic path, so that the magnetic path can be made shorter, as compared with that in a conventional thin-film magnetic head in which the layer under the upper core layer 42 is protuberantly formed. Hence, a certain level of recording characteristic can be maintained even if the number of turns of the coil layer 57 constituting the thin-film magnetic head 1A is reduced. Reducing the number of turns permits a reduction in coil resistance, so that heat generation in the thin-film magnetic head 1A is restrained while the thin-film magnetic head 1A is being driven. As a result, a problem in which the gap layer 40 bulges out beyond the surface opposing a recording medium can be restrained. Furthermore, since the length of a magnetic path can be reduced, a magnetic field reversing rate can be increased, thus making it possible to fabricate a thin-film magnetic head exhibiting excellent high-frequency characteristics.

In addition, the four-layer laminate 62 composed of the lower magnetic pole layer 39, the gap layer 40, the upper magnetic pole layer 41, and the upper core layer 42 can be deposited on the planarized surface, and the upper surface of the upper core layer 42 can be formed to be a substantially planarized surface. This makes it possible to easily and accurately form the second coil segments 56 on the planarized surface to have a predetermined configuration.

Referring to FIG. 3, the connection layers 61 are deposited beside the Gd-determining layer 38 and on the first coil segments 55. The connection layers 61 are constructed of a material layer 89 formed of the same material as that of the lower magnetic pole layer 39, a material layer 90 formed of the same material as that of the gap layer 40, a material layer 91 formed of the same material as that of the upper magnetic pole layer 41, and a material layer 92 formed of the same material as that of the upper core layer 42 in this order from bottom.

Therefore, the connection layers 61 can be formed by plating at the same time when the lower magnetic pole layer 39, the gap layer 40, the upper magnetic pole layer 41, and the upper core layer 42 are formed, thus permitting easier manufacture. The four layers of the connection layers 61 are formed plating, so that the connection layers 61 can be formed to predetermined dimensions with high accuracy. This allows the first coil segments 55 and the second coil segments 56 to be securely connected.

If the lower magnetic pole layer 39 or the upper core layer 42 is not provided, then the connection layers 61 can be constructed without forming the material layer 89 or the material layer 92.

In the thin-film magnetic head 1A, the Gd-determining layer 38 has the predetermined width W1 and it is formed to cover the upper surfaces 55c of the first coil segments 55. The width W1 of the Gd-determining layer 38 is set to be equal to or larger than a maximum width W2 of the four-layer laminate 62, including the magnetic pole layer 70. The Gd-determining layer 38 is formed of an insulating material, so that the Gd-determining layer 38 provides insulation between the first coil segments 55 and the magnetic pole layer 70.

The thin-film magnetic head 1A obviates the need for separately providing, from the Gd-determining layer, the insulating layer for isolating the first coil segments 55 and the magnetic pole layer 70. This makes it possible to simplify the construction of the thin-film magnetic head.

Preferably, as shown in FIG. 3, a thickness t2 of the Gd-determining layer 38 is set to be equal to a total thickness t3 of the thickness of the same material layer 89 as the lower magnetic pole layer 39 and the same material layer 90 as the gap layer 40.

With this arrangement, if the connection layers 61 are simultaneously formed when the magnetic pole layer 70 (or the four-layer laminate 62 if the upper core layer 42 is provided) is formed, then the upper surfaces of the connection layers 61 and the upper surface of the magnetic pole layer 70 (or the four-layer laminate 62 if the upper core layer 42 is provided) can be formed to be flush with each other upon completion of the formation of these two types of layers. Thus, the second coil segments 56 can be easily formed.

Since the upper surface of the gap layer 40 and the upper surface of the Gd-determining layer 38 are flush, the upper magnetic pole layer 41 can be deposited on the planarized surface. This makes it possible to planarize the upper magnetic pole layer 41, reduce the length of a magnetic path and inductance, and improve stability of the flow of magnetic fluxes.

In the thin-film magnetic head 1A, each of the connection layers 61 is composed of four material layers 89, 90, 91 and 92 (or three material layers 89, 90, and 91 if the upper core layer 42 is not provided). Alternatively, however, the connection layers 61 may be composed of, for example, a single layer. In such an arrangement, the ends 56a and 56b of the second coil segments 56 do not have to be significantly curved to direct them downward (toward the first coil segments) in order to connect the second coil segments with the first coil segments. This permits the second coil segments to be formed more easily. In addition, the first coil segments and the second coil segments can be connected securely and easily.

A manufacturing method of the thin-film magnetic head 1A shown in FIG. 1 will be explained with reference to the manufacturing steps illustrated in FIG. 5 through FIG. 11. A method for forming each of the layers from the lower core layer 29 up to the protective layer 60 shown in FIG. 1 will be described. The manufacturing steps illustrated in the figures are longitudinal sectional views of a thin-film magnetic head in process.

Figure 5:
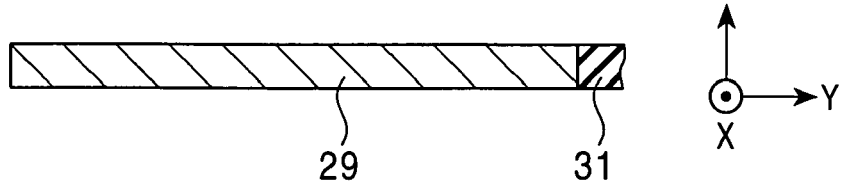
FIG. 5 is a diagram showing a step of a manufacturing method of the thin-film magnetic head shown in FIG. 1.

In the step illustrated in FIG. 5, the lower core layer 29 made of a NiFe-based alloy or the like and a lifting layer (not shown) provided on the lower core layer 29 at a position spaced away by a predetermined distance in the height direction are formed by plating. Then, a gap between the lower core layer 29 and the lifting layer is filled with a nonmagnetic material layer 31, such as $Al_2O_3$. Thereafter, the surfaces of the lower core layer 29, the nonmagnetic material layer 31, and the lifting layer are polished into flat surfaces by chemical mechanical polishing (CMP) or the like.

Figure 6:
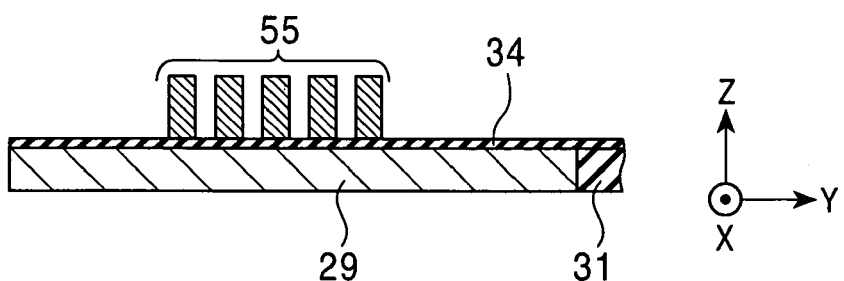
FIG. 6 is a diagram showing a step carried out after the step illustrated in FIG. 5.

In the step illustrated in FIG. 6, a coil insulating base layer 34 made of $Al_2O_3$ or the like is deposited on the surface of the lower core layer 29 by sputtering or the like. Then, a plurality of first coil segments 55 is formed on the coil insulating base layer 34 with intervals provided in the height direction. The first coil segments 55 are formed by plating with a nonmagnetic conductive material, such as Cu.

The plurality of first coil segments 55 may be formed to be parallel to each other. Alternatively, rather than forming them to be parallel to each other, only the portion overlapping the magnetic pole layer 70, which will be formed in a step discussed later, may be formed to be parallel to each other, while the portions positioned on both sides in the track width direction (the X-direction in the figure) of the magnetic pole layer 70 spread such that the distance in the height direction (the Y-direction in the figure) increases toward the ends 55a and 55b of the first coil segments 55. In a region overlapping the magnetic pole layer 70, the first coil segments 55 may not be formed to be parallel to each other.

Figure 7:
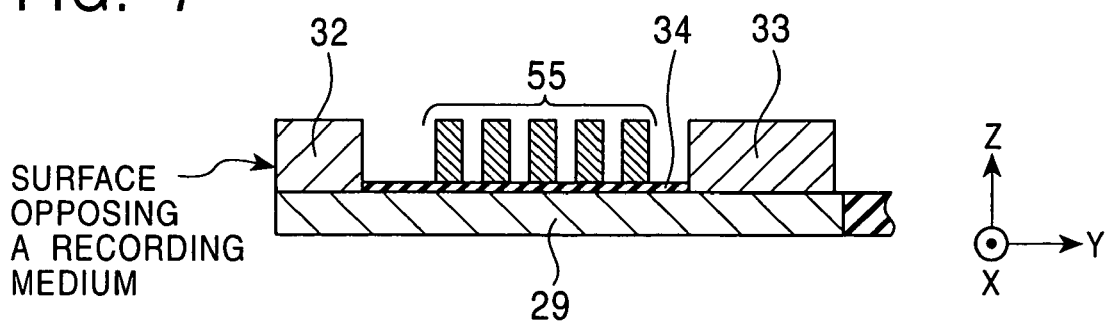
FIG. 7 is a diagram showing a step carried out after the step illustrated in FIG. 6.

In the step shown in FIG. 7, the coil insulating base layer 34 from the surface opposing a recording medium to the front end surfaces of the first coil segments 55 at the surface opposing a recording medium and the coil insulating base layer 34 formed in the vicinity of a proximal portion of the lower core layer 29 are removed by etching or the like. Then, the protuberant layer 32 is formed on the lower core layer 29 to a predetermined length in the height direction (the Y-direction in the figure) from the surface opposing a recording medium and the back gap layer 33 is also formed on the proximal portion of the lower core layer 29 in the same step. The coil insulating base layer 34 does not exist between the protuberant layer 32 and the back gap layer 33 and the lower core layer 29, and thus these three layers are magnetically connected.

The protuberant layer 32 and the back gap layer 33 are formed by exposure of their patterns on a resist (not shown), and implanting a magnetic material layer in the pattern by sputtering or the like. Thereafter, the resist layer is removed.

Referring to FIG. 7, the upper surface of the protuberant layer 32 and the upper surface of the back gap layer 33 are formed such that they are substantially flush. Following the step shown in FIG. 5, the step shown in FIG. 7 may be carried out, then the step shown in FIG. 6 may be carried out.

Figure 8:
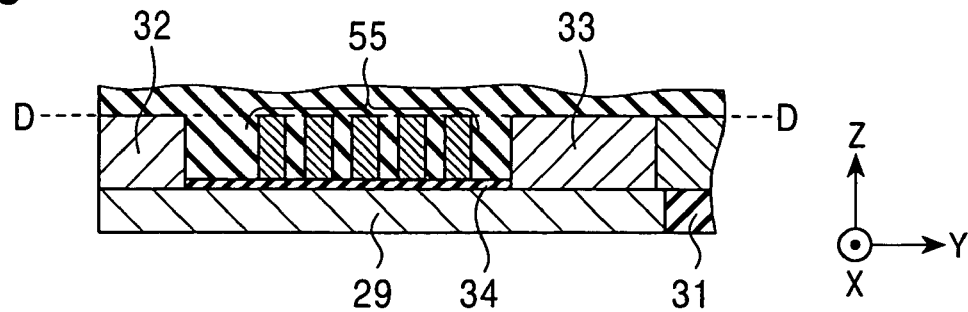
FIG. 8 is a diagram showing a step carried out after the step illustrated in FIG. 7.

In the step shown in FIG. 8, the gaps among the first coil segments 55, the upper surfaces of the first coil segments 55, the upper surface of the protuberant layer 32, and the upper surface of the back gap layer 33 are covered by the coil insulating layer 36 made of $Al_2O_3$ or the like. The coil insulating layer 36 is deposited by sputtering or the like.

Preferably, the resist layer is filled in the gaps of the first coil segments 55 before depositing the coil insulating layer 36. Providing the resist layer makes it possible to restrain the coil insulating layer 36 from becoming porous.

Figure 9:
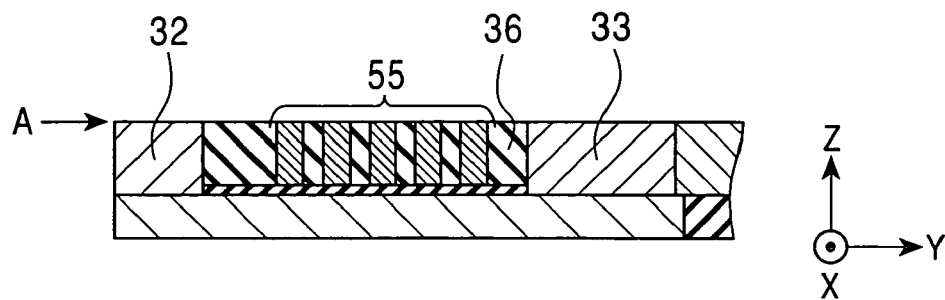
FIG. 9 is a diagram showing a step carried out after the step illustrated in FIG. 8.

Then, the coil insulating layer 36 is cut into line D—D shown in FIG. 8 from a direction parallel to plane X-Y by CMP or the like. FIG. 9 shows the coil insulating layer 36 upon completion of the cutting.

Referring to FIG. 9, the upper surface of the protuberant layer 32, the upper surfaces 55c of the first coil segments 55, the upper surface of the coil insulating layer 36, and the upper surface of the back gap layer 33 are formed to be planarized surfaces along a reference surface A. The gaps among the plural first coil segments 55 are fully insulated by the coil insulating layer 36, as shown in FIG. 9.

Figure 10:
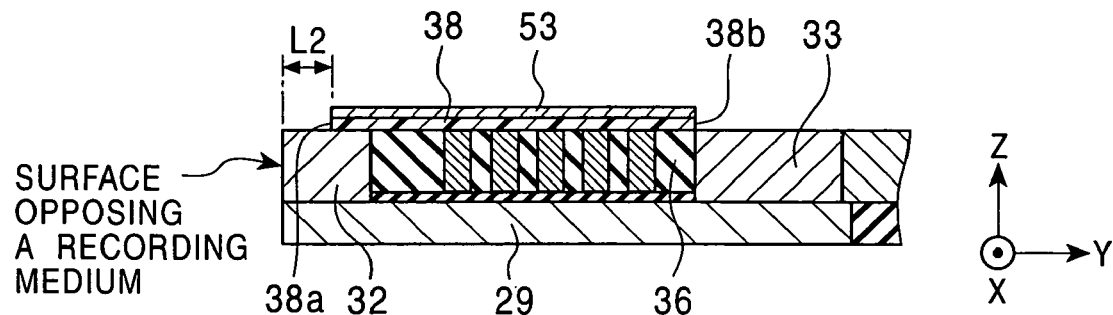
FIG. 10 is a diagram showing a step carried out after the step illustrated in FIG. 9.

In the step illustrated in FIG. 10, the front end surface 38a of the Gd-determining layer 38 is positioned at the minimum distance L2 in the height direction (the Y-direction in the figure) from the surface opposing a recording medium. The Gd-determining layer 38 is formed such that the rear end surface 38b of the Gd-determining layer 38 aligns with the front end surface 33a of the back gap layer 33 in the height direction.

Alternatively, the Gd-determining layer 38 may be formed such that the rear end surface 38b is positioned on the upper surface of the back gap layer 33. Further alternatively, the Gd-determining layer 38 may be formed such that the rear end surface 38b is positioned on the coil insulating layer 36 between a rear end 55d of the first coil segments 55, which are in the space encompassed by the protuberant layer 32, the lower core layer 29, and the back gap layer 33, and the front end surface 33a of the back gap layer 33 in the height direction.

The Gd-determining layer 38 having the predetermined width W1 is formed to cover the upper surfaces 55c of the first coil segments 55, and to have a dimension equal to or larger than a maximum width of the four-layer laminate 62, which includes the magnetic pole layer 70 illustrated in FIG. 11, which will be discussed hereinafter.

The Gd-determining layer 38 is formed of an insulating material, which may be an inorganic or organic insulating material. In this embodiment, an organic insulating material, such as a resist, is used to form the Gd-determining layer 38. After the Gd-determining layer 38 is formed, it is subjected to heat treatment to thermally cure the Gd-determining layer 38. This causes the surface of the Gd-determining layer 38 formed of the organic insulating material to be roundish.

Subsequently, the plating base layer 53 is deposited on the Gd-determining layer 38. There are several methods for forming the plating base layer 53. For example, a portion in which the plating base layer 53 is not to be formed, is covered with a resist beforehand, then the plating base layer 53 is deposited on the Gd-determining layer 38 by sputtering or the like. Thereafter, the resist is removed. The plating base layer 53 may be formed of a magnetic material or a nonmagnetic metal material. For instance, the plating base layer 53 may be formed of Ti/Au, a FeCo alloy, NiFe alloy, or the like.

The plating base layer 53 is deposited on the Gd-determining layer 38 in order to ensure good plating growth of the upper magnetic pole layer 41 to be deposited thereon and to prevent the plating of the upper magnetic pole layer 41 formed on the Gd-determining layer 38 by plating from being extremely thin.

The plating base layer 53 may be deposited on the Gd-determining layer 38 so as to extend from the front end surface 38a to the rear end surface 38b of the Gd-determining layer 38, as shown in FIG. 10. Alternatively, the plating base layer 53 may be partially deposited on the Gd-determining layer 38.

Figure 11:
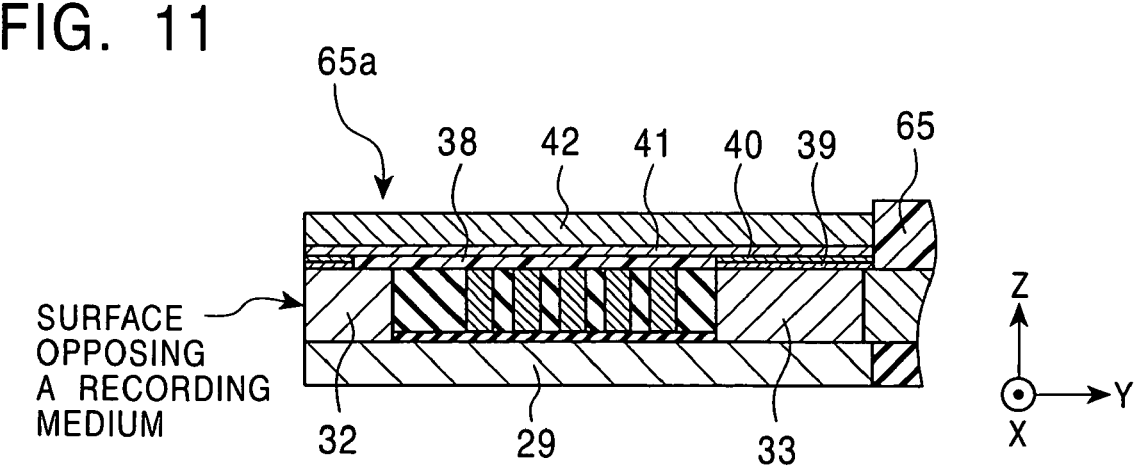
FIG. 11 is a diagram showing a step carried out after the step illustrated in FIG. 10.
Figure 12:
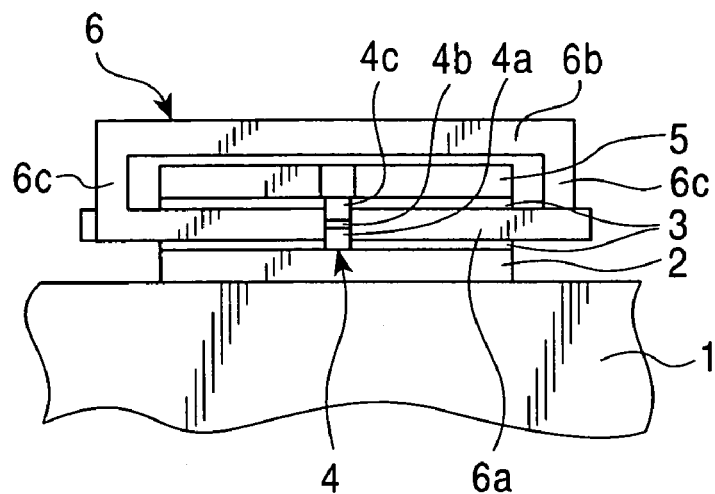
FIG. 12 is a partial front view showing a construction of a conventional thin-film magnetic head.
Figure 13:
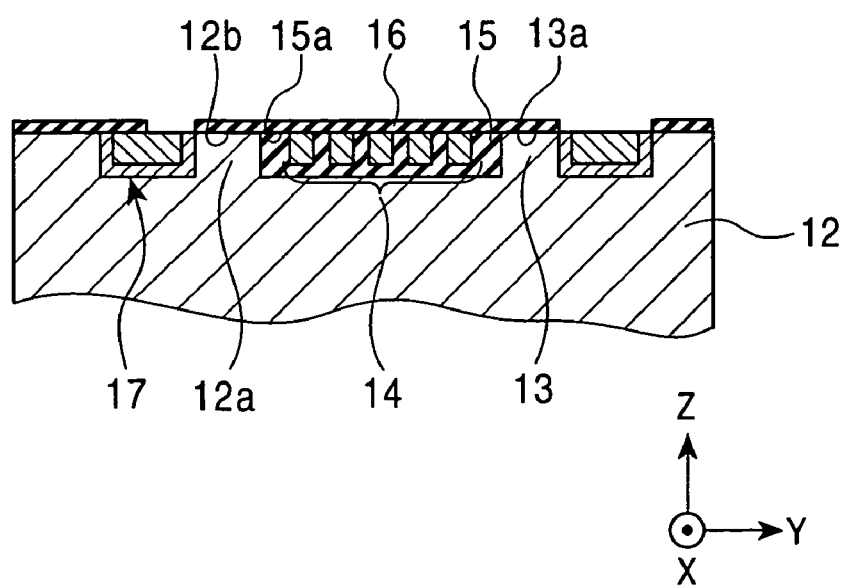
FIG. 13 is a partial longitudinal sectional view of another conventional magnetic head.

In the next step shown in FIG. 11, a resist layer 65 provided with a pattern 65a having, for example, a plane configuration with the distal portion B and the rear end portion C shown in FIG. 2, is formed. In the pattern 65a, the total four layers of the laminate 62, including the magnetic pole layer 70 composed of the lower magnetic pole layer 39, the gap layer 40, and the upper magnetic pole layer 41 in this order from bottom, and the upper core layer 42 are formed by plating in succession.

The maximum width W2 of the four-layer laminate 62 is equal to or less than the width W1 of the Gd-determining layer 38.

The plane configurations of the lower magnetic pole layer 39, the gap layer 40, the upper magnetic pole layer 41, and the upper core layer 42 have narrow distal portions B extending from the surface opposing a recording medium in the height direction (the Y-direction in the figure) and the rear end portions C whose track widths increase in the height direction from the proximal ends B1 on both sides of the distal portions B. At this time, the track width Tw is restricted by the width of the upper magnetic pole layer 41 in the track width direction (the X-direction in the figure) at the surface opposing a recording medium. The resist layer 65 is then removed.

If the lower magnetic pole layer 39, the gap layer 40, and the upper magnetic pole layer 41 were partially formed, then a coil layer or an insulating layer or the like would be generally formed behind these three layers. This requires a step for planarizing the upper surface of the upper magnetic pole layer 41 and the upper surface of the layer behind the upper magnetic pole layer 41 by CMP or the like. For this reason, the upper core layer 42 used to be formed after the planarizing step. In the step illustrated in FIG. 11, the lower magnetic pole layer 39, the gap layer 40, and the upper magnetic pole layer 41 are formed such that they extend onto the back gap layer 33. This obviates the need for the planarizing step, and allows the upper core layer 42 to be directly formed by plating on the upper magnetic pole layer 41. Hence, the upper core layer 42 can be easily formed with a reduced number of steps, and the upper core layer 42 can be deposited on the substantially planarized upper magnetic pole layer 41. This makes it possible to form the upper core layer 42 into a predetermined configuration with high accuracy.

In the step shown in FIG. 11, the upper magnetic pole layer 41 and the lower magnetic pole layer 39 may be formed using a material having a higher saturation flux density than that of the upper core layer 42, the lower core layer 29, the protuberant layer 32, or the back gap layer 33. This allows recording magnetic fields to be concentrated in the vicinity of a gap, so that a recording density can be improved. Furthermore, providing a layer with a high saturation flux density near the first coil segments 55 improves flux efficiency, permitting improved recording characteristics to be achieved.

In the step shown in FIG. 11, the gap layer 40 is formed by plating, so that the gap layer 40 is preferably formed using a nonmagnetic metal material that permits plating. Preferably, one type or two or more types may be selected from among NiP, NiReP, NiPd, NiW, NiMo, Au, Pt, Rh, Pd, Ru, and Cr to form the gap layer 40. Using these materials makes it possible to properly form by plating the gap layer 40 to a predetermined film thickness and also to impart proper nonmagnetism to the gap layer 40.

Using a NiP alloy for the gap layer 40 will provide easy plating, high heat resistance and good adhesion to the upper magnetic pole layer 41. Preferably, the concentration of the element P of the NiP alloy used for the gap layer 40 ranges from 8 percent by mass to 15 percent by mass. This allows stable nonmagnetism against external factors, such as heat. The composition of an alloy, such as a NiP alloy, used for the gap layer 40 can be measured using an X-ray analyzer or a waveform distributed type line analyzer or the like combined with a SEM and a TEM or the like.

In the present invention, the lower magnetic pole layer 39 is dispensable; however, providing the lower magnetic pole layer 39 permits a narrower gap. Similarly, the upper core layer 42 is dispensable; however, providing the upper core layer 42 makes it possible to improve recording characteristics.

The connection layers 61 shown in FIGS. 3 and 4 can be formed in the step shown in FIG. 11. In this case, a resist layer having, for example, a plane configuration of a columnar pattern shown in FIG. 4 is deposited. In this pattern, the material layer 89 formed of the same material as that of the lower magnetic pole layer 39, the material layer 90 formed of the same material as that of the gap layer 40, the material layer 91 formed of the same material as that of the upper magnetic pole layer 41, and the material layer 92 formed of the same material as that of the upper core layer 42 are successively deposited by plating in this order from bottom.

Thus, the connection layers 61 can be formed by plating simultaneously with the four-layer laminate 62 constituted of the lower magnetic pole layer 39, the gap layer 40, the upper magnetic pole layer 41, and the upper core layer 42, permitting easier fabrication. Moreover, the four-layer plating method used for producing the connection layers 61 allows the connection layers 61 to be formed to predetermined dimensions with high accuracy, so that the first coil segments 55 and the second coil segments 56 can be securely connected.

The connection layers 61 do not have to be necessarily formed at the same time with the four-layer laminate 62. Alternatively, the connection layers 61 may be formed before or after the four layers are formed.

Preferably, t3 indicating the total of the thickness of the same material layer 89 as the lower magnetic pole layer 38 and the same material layer 90 as the gap layer 40 is set to be equal to the thickness t2 of the Gd-determining layer 38.

With this arrangement, when the connection layers 61 are simultaneously formed with the four-layer laminate 62, the upper surfaces of the connection layers 61 and the upper surface of the four-layer laminate 62 can be set at the same level upon completion of the formation of the layers. Hence, in the step illustrated in FIG. 11, which will be discussed hereinafter, the second coil segments 56 can be easily formed.

If the lower magnetic pole layer 39 or the upper core layer 42 is not provided, then the connection layers 61 can be constructed without forming the material layer 89 or the material layer 92.

If each of the connection layers 61 is constructed of a single layer, then a different material layer is to be produced by plating in place of the material layers 89, 90, 91, and 92. According to this arrangement also, the ends 56a and 56b of the second coil segments 56 do not have to be greatly curved to direct them downward (toward the first coil segments), thus permitting easy formation of the second coil segments.

Moreover, the first coil segments and the second coil segments can be connected securely and easily.

Subsequently, following the step illustrated in FIG. 11, the insulating layer 58 and the resist layer 63 shown in FIG. 1 are deposited on the upper core layer 42, and then the plural second coil segments 56 are formed on the insulating layer 58 such that they are arranged, for example, at an angle with respect to the track width direction (the X-direction in the figure) so as to cross the magnetic pole layer 70. For instance, the plural second coil segments 56 can be formed to be parallel to each other, and the first coil segments 55 and the second coil segments 56 can be formed to be non-parallel to each other.

According to the present invention, the first coil segments 55 may be formed in the space encompassed by the lower core layer 29, the protuberant layer 32, and the back gap layer 33 such that they extend in the direction in which they cross the magnetic pole layer 70, the second coil segments 56 may be formed such that they cross the upper-surface of the magnetic pole layer 70, and adjacent ends of the first coil segments 55 may be connected through the intermediary of the second coil segments 56, thereby forming the helically wound coil layer 57.

Alternatively, for example, the plural first coil segments 55 may not be arranged to be parallel to each other, and only a portion of the plural second coil segments 56 that overlap the magnetic pole layer 70 may be arranged to be parallel to each other. The portions of the second coil segments 56 on both sides of the magnetic pole layer 70 in the track width direction (the X-direction in the figure) may be shaped such that the distance therebetween in the height direction (the Y-direction in the figure) increases towards the ends 56a and 56b.

In addition to increasing the intervals among the second coil segments 56 from the region where they overlap the magnetic pole layer 70 toward the ends 56a and 56b, the same may be applied to the first coil segments 55, or the same may be applied only to the first coil segments 55.

Alternatively, in the region overlapping the magnetic pole layer 70, the first coil segments 55 or the second coil segments 56 may not have any portions wherein they are arranged to be parallel to each other.

With this arrangement, the ends 56a and 56b of the second coil segments 56 can be formed easily, and the ends 55a and 55b of the first coil segments 55 and the ends 56a and 56b of the second coil segments 56 can be connected easily and securely.

When forming the second coil segments 56, the ends 56a and 56b of the second coil segments 56 are magnetically connected to the upper surfaces of the connection layers 61 so as to form the helical coil layer 57. As in the process for forming the second coil segments 56, the leader layer 59 shown in FIG. 1 or FIG. 4 is also formed.

Thereafter, the protective layer 60 shown in FIG. 1 is formed using $Al_2O_3$ or the like to complete the thin-film magnetic head 1A.

According to the manufacturing method of a thin-film magnetic head described above, the lower magnetic pole layer, the gap layer, the upper magnetic pole layer, and the upper core layer can be easily formed by plating into predetermined configurations on a planarized surface with high accuracy and with a reduced number of manufacturing steps.

The manufacturing method obviates the need for providing an insulating layer for isolating the first coil segments 55 and the magnetic pole layer 70 independently of the Gd-determining layer 38, making it possible to accomplish a reduced number of manufacturing steps and a simplified manufacturing process for fabricating a thin-film magnetic head.

If the connection layers 61 are simultaneously formed when the magnetic pole layer 70 (or the four-layer laminate 62 if the upper core layer 42 is provided) is formed, then the upper surfaces of the connection layers 61 and the upper surface of the magnetic pole layer 70 (or the four-layer laminate 62 if the upper core layer 42 is provided) can be formed to be flush with each other upon completion of the formation of these two types of layers. Thus, the second coil segments 56 can be easily formed.

The thin-film magnetic head in accordance with the present invention described in detail above is incorporated in a magnetic head device installed in, for example, a hard disk unit. The thin-film magnetic head may be used with a floating magnetic head or a contact magnetic head. Furthermore, the thin-film magnetic head may be used with a magnetic sensor or the like in addition to a hard disk unit.

What is claimed is:

1. A thin-film magnetic head comprising:
    a lower core layer which is formed such that the lower core layer extends in a height direction from a surface opposing a recording medium and on which a protuberant layer formed over a predetermined length in the height direction from the surface opposing the recording medium and a back gap layer formed in the height direction such that the back gap layer is away from a rear end surface of the protuberant layer by a predetermined distance in the height direction are deposited;
    a magnetic pole layer that connects the protuberant layer and the back gap layer, a track width Tw thereof being determined by a width dimension in the direction of track width at the surface opposing the recording medium; and
    a coil layer helically encompassing the magnetic pole layer,
    wherein a plurality of first coil segments extending in directions in which the first coil segments cross the magnetic pole layer is formed in the height direction with intervals provided thereamong in a space encompassed by the lower core layer, the protuberant layer, and the back gap layer, a coil insulating layer being provided among the first coil segments,
    an upper surface of the protuberant layer, upper surfaces of the first coil segments, and an upper surface of the back gap layer form a continuous planarized surface,
    a Gd-determining layer composed of an insulating material is formed to cover the upper surfaces of the first coil segments from a position apart in the height direction by a predetermined distance from the surface opposing a recording medium,
    the magnetic pole layer having a gap layer provided on the protuberant layer positioned closer to the surface opposing the recording medium than the Gd-determining layer is, and an upper magnetic pole layer deposited, beginning from the upper surface of the gap layer through the Gd-determining layer onto the back gap layer, and
    a plurality of second coil segments across the upper surface of the magnetic pole layer through the intermediary of the insulating layer is deposited on the magnetic pole layer with intervals provided thereamong in the height direction, and ends of adjacent ones of the first coil segments are connected through the intermediary of the second coil segments so as to form the helically wound coil layer.

2. The thin-film magnetic head according to claim 1, wherein a lower magnetic pole layer having a width that is smaller than the width of the protuberant layer in the track width direction is provided under the gap layer.

3. The thin-film magnetic head according to claim 1, wherein the lower magnetic pole layer, the gap layer, and the upper magnetic pole layer are formed by plating.

4. The thin-film magnetic head according to claim 1, wherein one end of each of the first coil segments and one end of each of the second coil segments are positioned beside the Gd-determining layer and connected through the intermediary of connection layers formed on the first coil segments.

5. The thin-film magnetic head according to claim 4, wherein connection layers have the same material layer as the lower magnetic pole layer, the same material layer as the gap layer, and the same material layer as the upper magnetic pole layer in this order from bottom.

6. The thin-film magnetic head according to claim 5, wherein the same material layer as the lower magnetic pole layer, the same material layer as the gap layer, and the same material layer as the upper magnetic pole layer are formed by plating.

7. The thin-film magnetic head according to claim 1, wherein the lower magnetic pole layer and the gap layer are formed on the planarized surface farther at the rear side than the Gd-determining layer with respect to the height side, and the upper magnetic pole layer is deposited on the gap layer.

8. The thin-film magnetic head according to claim 7, wherein the upper magnetic pole layer, the gap layer, and the lower magnetic pole layer are formed to have the same planar configuration, and a width of the upper magnetic pole layer in the direction of the track width at the surface opposing a recording medium determines the track width Tw.

9. The thin-film magnetic head according to claim 1, wherein an upper core layer is deposited on the upper magnetic pole layer.

10. The thin-film magnetic head according to claim 9, wherein connection layers are formed by depositing the same material layer as the upper core layer on the same material layer as the magnetic pole layer.

11. The thin-film magnetic head according to claim 1, wherein thickness of the Gd-determining layer is equal to a total thickness of the lower magnetic pole layer and the gap layer.

12. A manufacturing method for a thin-film magnetic head, including:
    (a) extending a lower core layer in a height direction from a surface opposing a recording medium;
    (b) depositing a coil insulating base layer on the lower core layer, then forming a plurality of first coil segments extending in a direction in which the first coil segments intersect with a magnetic pole layer on the coil insulating base layer in a predetermined region with intervals provided in the height direction;
    (c) forming a protuberant layer on the lower core layer at a position where the protuberant layer does not contact front end surfaces of the first coil segments that are adjacent to the surface opposing the recording medium from the surface opposing the recording medium in the height direction before or after (b), then forming a back gap layer on the lower core layer at a position where the back gap layer is apart in the height direction from a rear end surface of the protuberant layer in the height direction and does not come in contact with the first coil segments;

(d) filling gaps among the first coil segments with a coil insulating layer;

(e) grinding an upper surface of the protuberant layer, upper surfaces of the first coil segments, and an upper surface of the back gap layer to form the upper surfaces into a continuous planarized surface;

(f) forming a Gd-determining layer made of an insulating material, which covers the first coil segments from a position apart by a predetermined distance in the height direction from the surface opposing the recording medium;

(g) forming the magnetic pole layer having a lower magnetic pole layer and a gap layer provided on the protuberant layer, which is closer to the surface opposing the recording medium than the Gd-determining layer is, and an upper magnetic pole layer formed, beginning from the upper surface of the gap layer through the upper surface of the Gd-determining layer to the upper surface of the back gap layer; and (h) forming an insulating layer on the magnetic pole layer, then forming a plurality of second coil segments across the magnetic pole layer in the height direction with intervals provided among the second coil segments, and connecting ends of adjacent first coil segments through the intermediary of the second coil segments so as to form a helically wound coil layer.

13. The manufacturing method for a thin-film magnetic head according to claim 12, wherein a lower magnetic pole layer having a smaller width than a width in the direction of track width of the protuberant layer is provided under the gap layer in (g).

14. The manufacturing method for a thin-film magnetic head according to claim 12, further comprising:

(i) forming connection layers positioned beside the Gd-determining layer and on the first coil segments at the same time or before or after (f).

15. The manufacturing method for a thin-film magnetic head according to claim 14, wherein the connection layers are formed of the same material layer as the lower magnetic pole layer, the same material layer as the gap layer, and the same material layer as the upper magnetic pole layer in this order from bottom in (i).

16. The manufacturing method for a thin-film magnetic head according to claim 12, wherein the lower magnetic pole layer, the gap layer, and the upper magnetic pole layer are successively formed by plating in (g).

17. The manufacturing method for a thin-film magnetic head according to claim 16, wherein the same material layer as the lower magnetic pole layer, the same material layer as the gap layer, and the same material layer as the upper magnetic pole layer are formed in succession by plating in (i).

18. The manufacturing method for a thin-film magnetic head according to claim 12, wherein the upper core layer is deposited on the magnetic pole layer after (g).

19. The manufacturing method for a thin-film magnetic head according to claim 18, wherein the same material layer as the upper core layer is deposited on the same material layer as the magnetic pole layer of the connection layers after (g).

20. The manufacturing method for a thin-film magnetic head according to claim 12, wherein a total thickness of the lower magnetic pole layer and the gap layer is set to the same thickness of the Gd-determining layer in (g).

* * * * *